(12) United States Patent
Henry

(10) Patent No.: US 12,350,767 B2
(45) Date of Patent: Jul. 8, 2025

(54) WELDING POWER SUPPLY WITH HALF BRIDGE

(71) Applicant: Illinois Tool Works Inc., Glenview, IL (US)

(72) Inventor: Andrew J. Henry, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/121,083

(22) Filed: Mar. 14, 2023

(65) Prior Publication Data

US 2023/0390852 A1 Dec. 7, 2023

Related U.S. Application Data

(60) Continuation of application No. 16/725,809, filed on Dec. 23, 2019, now Pat. No. 11,602,801, which is a
(Continued)

(51) Int. Cl.
*B23K 9/10* (2006.01)
*H02M 1/00* (2007.01)
(Continued)

(52) U.S. Cl.
CPC ......... *B23K 9/1075* (2013.01); *H02M 7/4807* (2013.01); *H02M 7/538* (2013.01);
(Continued)

(58) Field of Classification Search
CPC .. B23K 9/1043; B23K 9/1062; B23K 9/1075; B23K 9/09; B23K 9/091; B23K 9/093;
(Continued)

(56) References Cited

U.S. PATENT DOCUMENTS 6,115,273 A 9/2000 Geissler
6,194,681 B1 * 2/2001 Moriguchi ........... B23K 9/1006
219/121.57
(Continued)

OTHER PUBLICATIONS

Extended European Search Report, Apr. 25, 2017, European Patent Office, 80298 Munich Germany.

*Primary Examiner* — Dana Ross
*Assistant Examiner* — James F Sims, III
(74) *Attorney, Agent, or Firm* — McAndrews, Held & Malloy, Ltd.

(57) ABSTRACT

A method and apparatus for providing welding-type power is disclosed. It includes an input circuit, a dc bus, an output circuit, and a control module. The input circuit receives power and provides an intermediate signal to the bus. The output circuit receives the dc bus and provides an ac welding-type output. The output circuit includes a half-bridge output inverter with at least first and second switches. The output inverter further includes an output control circuit. The output control circuit provides freewheeling paths that includes control switches, the output, antiparallel diodes. The control module has a four quadrant control module that provides control signals to the half bridge output inverter and provides modulating control signals to the first and second output control switches. The modulating signals cause the output control switches to be turned on and off multiple times to control a rate of change of output current.

20 Claims, 6 Drawing Sheets

Related U.S. Application Data division of application No. 14/986,284, filed on Dec. 31, 2015, now Pat. No. 10,549,374.

(51) Int. Cl.
  *H02M 7/48* (2007.01)
  *H02M 7/538* (2007.01)
  *H02M 7/5387* (2007.01)

(52) U.S. Cl.
  CPC ......... *H02M 7/5387* (2013.01); *B23K 9/1062* (2013.01); *H02M 1/0029* (2021.05); *H02M 1/007* (2021.05)

(58) Field of Classification Search
  CPC .. H02M 1/0029; H02M 1/007; H02M 7/4807; H02M 7/538; H02M 7/5387
  USPC ..................................................... 219/130.32

See application file for complete search history.

(56) References Cited

U.S. PATENT DOCUMENTS

| | | | |
|---|---|---|---|
| 6,797,922 B2 * | 9/2004 | Katooka | B23K 9/092 |
| | | | 219/130.51 |
| 6,801,143 B2 | 10/2004 | Oberai | |
| 6,987,242 B2 | 1/2006 | Geissler | |
| 8,129,934 B2 | 3/2012 | Ando | |
| 8,389,898 B2 * | 3/2013 | Aigner | B23K 9/0956 |
| | | | 219/137 PS |
| 9,120,172 B2 | 9/2015 | Dodge | |
| 10,549,374 B2 | 2/2020 | Henry | |
| 2009/0230941 A1 | 9/2009 | Vogel | |
| 2010/0193488 A1 * | 8/2010 | Aigner | B23K 9/0956 |
| | | | 219/130.32 |
| 2010/0320182 A1 | 12/2010 | Madsen | |
| 2014/0083987 A1 | 3/2014 | Dodge | |
| 2014/0263240 A1 * | 9/2014 | Henry | B23K 9/1043 |
| | | | 219/130.21 |
| 2015/0015177 A1 | 1/2015 | Jain | |
| 2015/0280612 A1 * | 10/2015 | Ide | H02M 7/5395 |
| | | | 363/98 |
| 2016/0144442 A1 * | 5/2016 | Tanaka | B23K 9/167 |
| | | | 219/130.21 |

\* cited by examiner

WELDING POWER SUPPLY WITH HALF BRIDGE

FIELD OF THE INVENTION

The present disclosure relates generally to the art of providing welding type power. More specifically, it relates to providing welding type power using a half-bridge inverter based output circuit.

BACKGROUND OF THE INVENTION

There are many known types of welding-type power supplies that provide welding type power. Welding type power, as used herein, refers to power suitable for electric arc welding, plasma arc cutting or induction heating. Welding-type power supply, as used herein, refers to a power supply that can provide welding type power. Welding type systems are used to perform a variety of processes and used in a variety of settings. Welding-type system, as used herein, is a system that can provide welding type power, and can include control and power circuitry, wire feeders, and ancillary equipment.

Some welding type systems include an input circuit and/or a preregulator which provide a dc bus, followed by an inverter based output circuit. The preregulator conditions the input power, and provides a known dc bus. The inverter based output circuit receives the bus and provides the welding type power as an output. One successful design includes a boost circuit as part of the preregulator, and the output circuit includes an inverter, transformer, rectifier and output inductor. This type of welding type power supply is described in U.S. Pat. No. 6,987,242 (Geissler). Other welding type power supplies that have inverter based output circuits include U.S. Pat. No. 6,115,273 (Geissler) and Patent Publication 20090230941 (Vogel), all three of which are owned by the owner of this patent, and all three of which are hereby incorporated by reference. Other welding type power supplies include an input circuit that has an input transformer, and\ or derives power from an engine/generator and/or derives power from an energy storage device such as a fuel cell or battery. Welding type power supplies can include additional stages, or use other topologies for each stage (such as a buck preregulator, a combined rectifier-boost preregulator, a chopper instead of or following the inverter, a second inverter following the first inverter, etc.

Inverter based output circuits offer many advantages, but they do have some drawbacks. First, the switches and diodes used in an inverter circuit can fail, particularly when exposed to higher than rated voltages. Clamping voltages is known, but can result in excess losses. Also, commutating switches and diodes can create excess heat. U.S. Pat. No. 6,801,443 returned the entire clamp energy back into the output in one single switching event. US Patent Publication 2014-0263240, owned by the inventor of this invention and incorporated by reference, discloses a way to effectively return commutation energy.

A full bridge output inverter is described in US Patent Publication 2014-0263240. The output inverter is used to invert the dc bus to provide an ac output. An ac weld output typically has a frequency of between about 20-400 Hz. When the output polarity is reversed the current must cross zero. During zero crossing there is a risk that the arc rectifies/extinguishes. A very rapid zero crossing reduces the likelihood of arc rectification.

Prior art patent U.S. Pat. No. 9,120,172 B2 and application US 20140083987 A1, purport to be able to decrease the amperage rapidly by switching a high impedance path into and out of the weld circuit, thus changing the decay time constant. This passive circuitry dissipates extra heat within the power source—it wastes power and generates unwanted heat.

US Patent Publication 2014-0263240 provides a much better alternative to the prior art that wastes power by helping the arc stay to stay lit during the transition from one polarity to using an assist circuit that applies a high voltage to the output and drives the current up to a certain level. Before inverting the polarity of the main steering IGBT in the AC output, the output inverter switch is left and power to the inverter is removed. The output current then decays slowly (freewheeling through the switch and the transformer). Then the on/off states of the inverter switches are reversed, and power is applied in the new polarity. During this time the output will not have the desired waveshape. Once the IGBTs are switched, the current falls rapidly in an uncontrolled high di/dt manner A high voltage source (in the form of a buck circuit) assisted in arc reversal and driving the current up. Alternatives provide for using additional taps on a transformer for the source of high voltage.

Because US Patent Publication 2014-0263240 teaches that the current decreases naturally (freewheeling through the switch and transformer) toward zero prior to polarity reversal, and that after the current reverses, the assist switch was closed and remained closed, the rate of change of the current (di/dt) was not controlled. Rather, di/dt was set by the assist voltage and components in the circuit. When di/dt rate was not otherwise controlled the current is not at the desired levels while decaying or increasing, and the output cannot follow a desired wave shape. At some predetermined output, around about 100 amps, the assist switch is opened and control reverted back to "normal" operation. Normal control refers to controlling the output magnitude by controlling the input to the inverter.

US Patent Publication 2014-0263240 described a full bridge inverter as the preferred embodiment, and taught it could be implemented as a half bridge inverter. However, there was no control of increasing and decreasing current for both positive and negative output using a half-bridge inverter—the prior art half bridge inverters do not provide four quadrant control. Four quadrant control, as used herein, is a is control of the output in four quadrants—electrode positive with actively driving an increase or decrease of the output current current, and electrode negative with actively driving an increase or decrease of the output current.

Four quadrant control can be provided using a full bridge inverter, but that requires four relatively expensive switches, each having to handle the weld current. Additionally, if assist or energy recovery is to be performed, then an additional switch is needed. Thus, the prior art either required more switches (full-bridge) or provide less control of the rate of change of the current (half-bridge). Also, prior art using a high voltage to assist commutation has additional circuitry to create the high voltage. Moreover, because the prior art provided the higher voltage only during output current zero-crossing it was not able to assist the process during transient. Transient, as used herein, is a sudden change in the load or input that cause the control loop to react, such as short circuiting of the arc, a sudden change in arc voltage, a longer arc, a melting electrode, a drop in the input voltage, etc.

FIG. 2 shows a prior art half bridge output inverter welding type output circuit, such as the half bridge version of US Patent Publication 2014-0263240. It includes inverter switches 202 and 203, with anti-parallel diodes 204 and 205.

A plurality of rectifying diodes 218 and 219, along with a transformer 221 feed the inverter.

An electrode positive (EP) output is provided when switch 202 is on, switch 203 is off, and the current flows from a center tap on a main transformer windings 222 through an output inductor 214 (as shown by arrow 227), through the electrode output, across the arc to the work output, through switch 202, and back (arrow 228) through rectifying diodes 218 to the main windings 222. Electrode output, as used herein is the output of the machine to which an electrode is typically connected. Work output, as used herein is the output of the machine to which an electrode is typically connected.

An electrode negative (EN) output is provided when switch 202 is off switch 203 is on, and current flows from rectifying diodes 219 through switch 203 (which is on), through the work, across the arc to the electrode, through the output inductor 214 (opposite of arrow 227), and back to the center tap on main transformer windings 222. An electrode positive (EP) output is provided when switch 203 is off switch 202 is on, and current flows from the center tap on main transformer windings 222.

US Patent Publication 2014-0263240 provided for reversal of the current from EP to EN by reducing or removing the power provided to the inverter, and leaving switch 202 on. Inductor 214 causes current tor freewheel through inductor 214, switch 202 and winding 222. The current decayed at the rate set by the voltage and the inductances, but is not controlled. When current was reduced to close to zero switch 202 was turned off and 203 turned on, along with assist switch 207.

US Patent Publication 2014-0263240 taught to use assist switches 207 and 208 and an inductor 212 to help increase current magnitude after zero crossing. Assist switch 207 applied the high voltage to assist the current magnitude increase in the EN polarity. The current reversed through the electrode and work (to EN). The EN path included rectifying diodes 219, switch 203 (which was on), the work, the arc, the electrode, output inductor 214 (opposite of arrow 227), and the center tap on main transformer windings 222. The high voltage caused the current magnitude to increase at the rate set by the voltage and inductance, but was not controlled.

FIG. 3 shows the uncontrolled decay of current (di/dt) for an EP to EN reversal in segment 302 and a current increase (di/dt) at a rate set by the voltage source (but otherwise uncontrolled) after zero crossing in segment 301. The EN to EP reversal was done in a similar way. When di/dt is uncontrolled the desired output waveform might not be provided.

Accordingly, a welding type power supply with an inverter output circuit that is clamped in an efficient manner is desirable. Preferably, such welding type power supply would also provide for efficient commutations of devices, be able to handle transients, be able to control di/d during reversals, and/or be able to provide a source of high voltage for assisting commutation and handling of transients.

SUMMARY OF THE PRESENT INVENTION

According to a first aspect of the disclosure a welding-type power supply includes an input circuit, a dc bus, an output circuit, and a control module. The input circuit receives input power and provides an intermediate signal that is received by the dc bus. The output circuit receives the dc bus and provides an ac welding-type output across an electrode output and a work output. In some embodiments the output circuit includes a primary side inverter, a transformer and a rectifier that serve as a current source for a half bridge output inverter. The dc bus, primary side inverter, transformer and rectifier may be consider part of the input circuit, the output circuit, or an intermediate circuit. The half-bridge inverter has at least a first and second switch. The half bridge inverter is connected to receive power from the dc bus and to provide power to the output and further includes a commutation circuit that has a first freewheeling path including a first commutation switch, the electrode output, the work output and a diode antiparallel to the first switch. The control module includes an inverter control module that controls the half bridge inverter, and a commutation control module that provides modulating control signals to the first commutation switch. The modulating control signals cause the commutation switch to be turned on and off multiple times during commutation of the current to the first switch, which controls a first rate of change of a current in the output.

According to a second aspect of the disclosure a welding-type power supply includes an input rectifier, a dc bus, an output circuit, and a control module. The input rectifier receives input power and provides a rectified intermediate signal that is received by the dc bus. The output circuit receives the dc bus and provides an ac welding-type output across an electrode output and a work output. The output circuit includes a half-bridge inverter that has at least a first and second switch. The half bridge inverter is connected to receive power from the dc bus and to provide power to the output and further includes a boost circuit. The boost circuit includes an inverter dc bus, a boost inductor, and a boost switch. The control module includes an inverter control module that controls the half bridge inverter, and a boost control module that provides modulating control signals to the boost switch. The modulating control signals cause the boost switch and the boost inductor to operate as a boost circuit to boost a voltage on the inverter dc bus to a desired magnitude when the first switch is on and not commutating.

According to a third aspect of the disclosure a welding-type power supply includes an input circuit, a dc bus an output circuit, and a control module. The input circuit receives input power and provides an intermediate signal that is received by the dc bus. The output circuit receives the dc bus and provides an ac welding-type output across an electrode output and a work output. The output circuit includes a half-bridge inverter that has at least a first and second switch. The half bridge inverter is connected to receive power from the dc bus and to provide power to the output and further includes an output control circuit. The output control circuit provides a first freewheeling path that includes a first control switch, the electrode output, the work output and a diode antiparallel to the first switch, as well as a second output control switch that provides a second freewheeling path that includes the second output control switch, the electrode output, the work output and a diode antiparallel to the second switch. The control module has an inverter control module that provides control signals to the half bridge inverter, and has a ramp module that provides modulating control signals to the first and second output control switches. The modulating control signals cause at least one of the first and second output control switches to be turned on and off multiple times to control a rate of change of a current in the output.

According to a fourth aspect of the disclosure a welding-type power supply includes an input circuit, a dc bus an output circuit, and a control module. The input circuit receives input power and provides an intermediate signal that is received by the dc bus. The output circuit receives the dc bus and provides an ac welding-type output across an electrode output and a work output. The output circuit includes a half-bridge inverter that has at least a first and second switch. The half bridge inverter is connected to receive power from the dc bus and to provide power to the output and further includes an output control circuit. The output control circuit provides a first freewheeling path that includes a first control switch, the electrode output, the work output and a diode antiparallel to the first switch, as well as a second output control switch that provides a second freewheeling path that includes the second output control switch, the electrode output, the work output and a diode antiparallel to the second switch. The control module has an inverter four quadrant control module that provides control signals to the half bridge inverter and provides modulating control signals to the first and second output control switches. The modulating control signals cause at least one of the first and second output control switches to be turned on and off multiple times to control a rate of change of a current in the output.

According to a fifth aspect of the disclosure a method of providing welding-type power includes receiving input power and providing an intermediate signal. The intermediate signal is inverted by controlling a first switch and a second switch in a half bridge inverter, to provide an output. Current to the first switch is commutated and a first rate of change of a current in the output is controlled by turning a first commutation switch on and off multiple times during commutation of the current to the first switch.

According to a sixth aspect of the disclosure a method of providing welding-type power receiving input power and providing an intermediate signal. The intermediate signal is inverted by controlling a first switch and a second switch in a half bridge inverter, to provide an output. A first boost switch is controlled such that the first boost switch and a boost inductor operate as a boost circuit to boost a voltage of the intermediate signal to a desired magnitude when the first switch is on and not commutating.

According to a seventh aspect of the disclosure a method of providing welding-type power receiving input power and providing an intermediate signal. The intermediate signal is inverted by controlling a first switch and a second switch in a half bridge inverter, to provide an output. A rate of change of an output current is controlled by modulating a first output control switch. When the first output control switch is turned on a first freewheeling path that includes the first output control switch, the output, and a diode antiparallel to the first switch is created. The rate of change of the output current is also controlled by modulating a second output control switch. When second output control switch is turned on a second freewheeling path that includes the second output control switch, the output, and a diode antiparallel to the second switch, is created.

According to an eight aspect of the disclosure a method of providing welding-type power receiving input power and providing an intermediate signal. The intermediate signal is inverted by controlling a first switch and a second switch in a half bridge inverter, to provide an output. A first output control switch is modulated, and when the first output control switch is turned on a first freewheeling path that includes the first output control switch, the output, and a diode antiparallel to the first switch is created. A second output control switch is modulated and when the second output control switch is turned on a second freewheeling path that includes the second output control switch, the output, and a diode antiparallel to the second switch is created. The output signal is controlled in four quadrants by controlling the turning on and off of the first switch, the second switch, the first output control switch, and the second output control switch.

The commutation circuit includes a second commutation switch that, when on, provides a second freewheeling path that includes the second commutation switch, the electrode output, the work output and a second diode antiparallel to the second switch, and the commutation control module provides the modulating control signals to the second commutation switch that cause the second commutation switch to be turned on and off multiple times during commutation of the current from the first switch to the second switch, whereby a second rate of change of current in the output is controlled. in one alternative.

An output inductor is disposed such that current in the output inductor also flows across the work output and the electrode output and at least one of the first switch and the second switch in another alternative.

The input circuit includes at least one of a rectifier, an energy storage device, a battery, generator, a transformer, a converter and a boost circuit in various embodiments.

The modulating control signals cause the first commutation switch and the second commutation switch to be off other than during commutation of current from at least one of the second switch and the first switch in various embodiments.

A commutation inductor is in at least one of the first second freewheeling paths in another alternative.

The commutation control module provides at least one of pulse width, pulse frequency and hysteretic modulating control signals to the commutation switch in other embodiments.

The modulating control signals cause the first commutation switch and the commutation inductor to operate as a boost circuit to boost a voltage on an inverter dc bus to a desired magnitude when the first switch is on and not commutating in various embodiments.

The modulating control signals also cause the second commutation switch and the commutation inductor to operate as a second boost circuit to boost the voltage on the inverter dc bus to the desired magnitude when the second switch is on and not commutating in another alternative.

A feedback circuit provides a feedback signal indicative of a magnitude of the output to the control module, and the ramp module is responsive to the feedback signal, and/or the output rate of change is controlled in response to the feedback signal in one embodiment.

The control module includes a transient detection module, and the transient detection module responds to the feedback signal and the ramp module is responds to the transient detection module, and/or the rate of change is controlled in response to detecting a transient in various embodiments.

The welding type output is a dc output and the control module includes a dc control module in another alternative.

Providing an intermediate signal includes boosting the input power in one embodiment.

Other principal features and advantages of will become apparent to those skilled in the art upon review of the following drawings, the detailed description and the appended claims.

Figure 1:
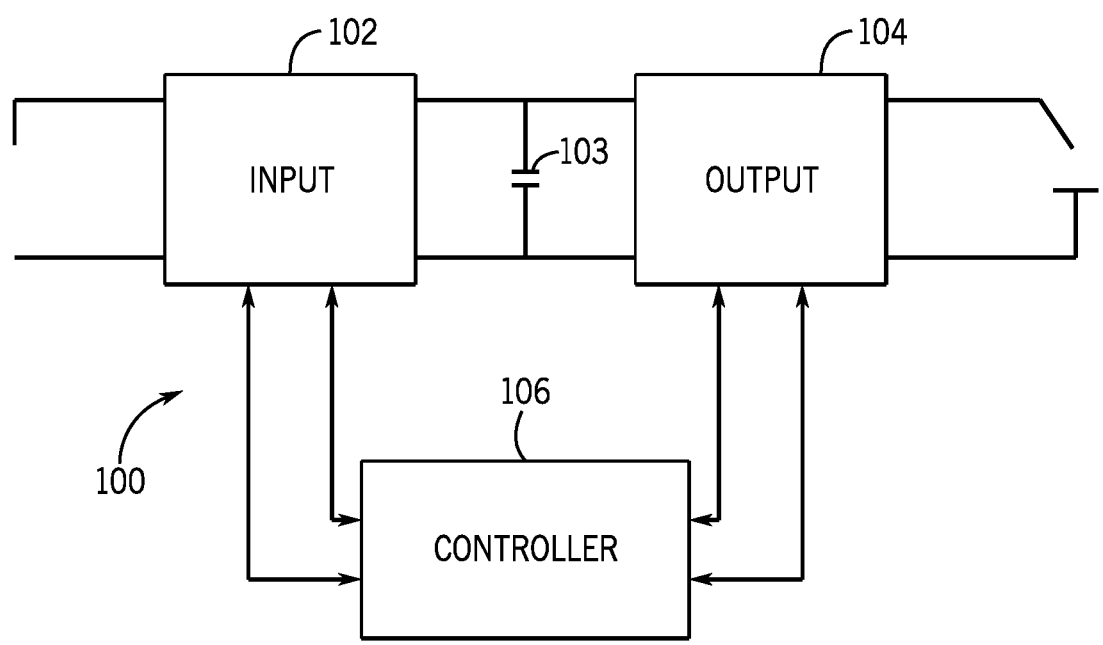
FIG. 1 is a diagram of a welding-type system in accordance with the preferred embodiment.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular circuit with particular components, it should be understood at the outset that the welding type power supply can also be implemented with other components and circuits.

A welding type power supply is disclosed that includes a half bridge output inverter and provides four quadrant control of the output current. The output circuit includes two inverter switches, and two assist or commutation switches. The assist switches can be used for controlling the rate of change of the current output (di/dt), to assist with commutation, to handle transients, and/or to provide a high voltage source. Commutating, as used herein, is the process of transferring current from one direction through the output to the other, and from one switch to another within a circuit.

FIG. 1 is a diagram of a welding-type system 100 in accordance with the preferred embodiment. Welding-type system 100 includes an input circuit or preregulator 102, an output circuit 104 and a controller 106. These modules are preferably designed as shown in US Patent Publication 2014-0263240 and shown in FIG. 1, except as set forth herein.

Preregulator 102 preferably includes an input rectifier and a boost preregulator, but other topologies such as an unboosted rectifier, a buck, cuk, etc. may be used. Preregulator 102 preferably provides a 940V regulated dc bus (referred to herein as the dc bus) across a capacitor 103 to an output circuit 104. Output circuit 104 preferably includes a primary inverter, a transformer, a rectifier and a half bridge output inverter. Other embodiments provide for other inputs to the half bridge output inverter, including a transformer input, an engine/generator input, an energy storage device (for example a battery or fuel cell) providing the input power, an unregulated bus, or for additional stages as part of input circuit 102, between input circuit 102 and output circuit 104, or before or as part of output circuit 104.

The present disclosure provides a way to control the rate of change of the output current (di/dt). According to the preferred embodiment the rate of change can be controlled in all four quadrants. Other embodiments provide for control in less than all four quadrants, or only during output current reversals. Also, in one embodiment a boosted voltage source is created to assist with commutation (reversal), di/dt control and transients.

Figure 2:
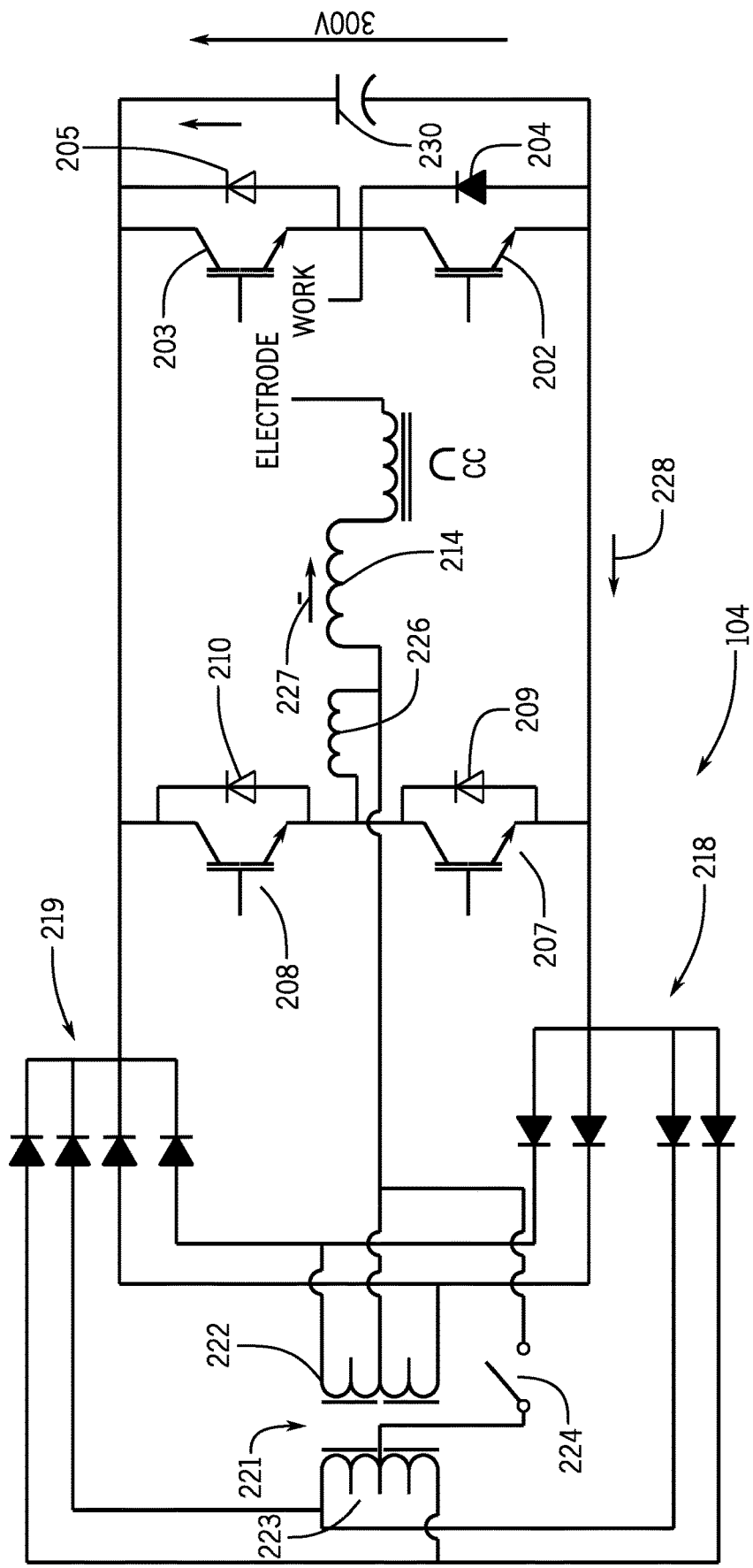
FIG. 2 is a circuit diagram of a prior art half bridge inverter.
Figure 3:
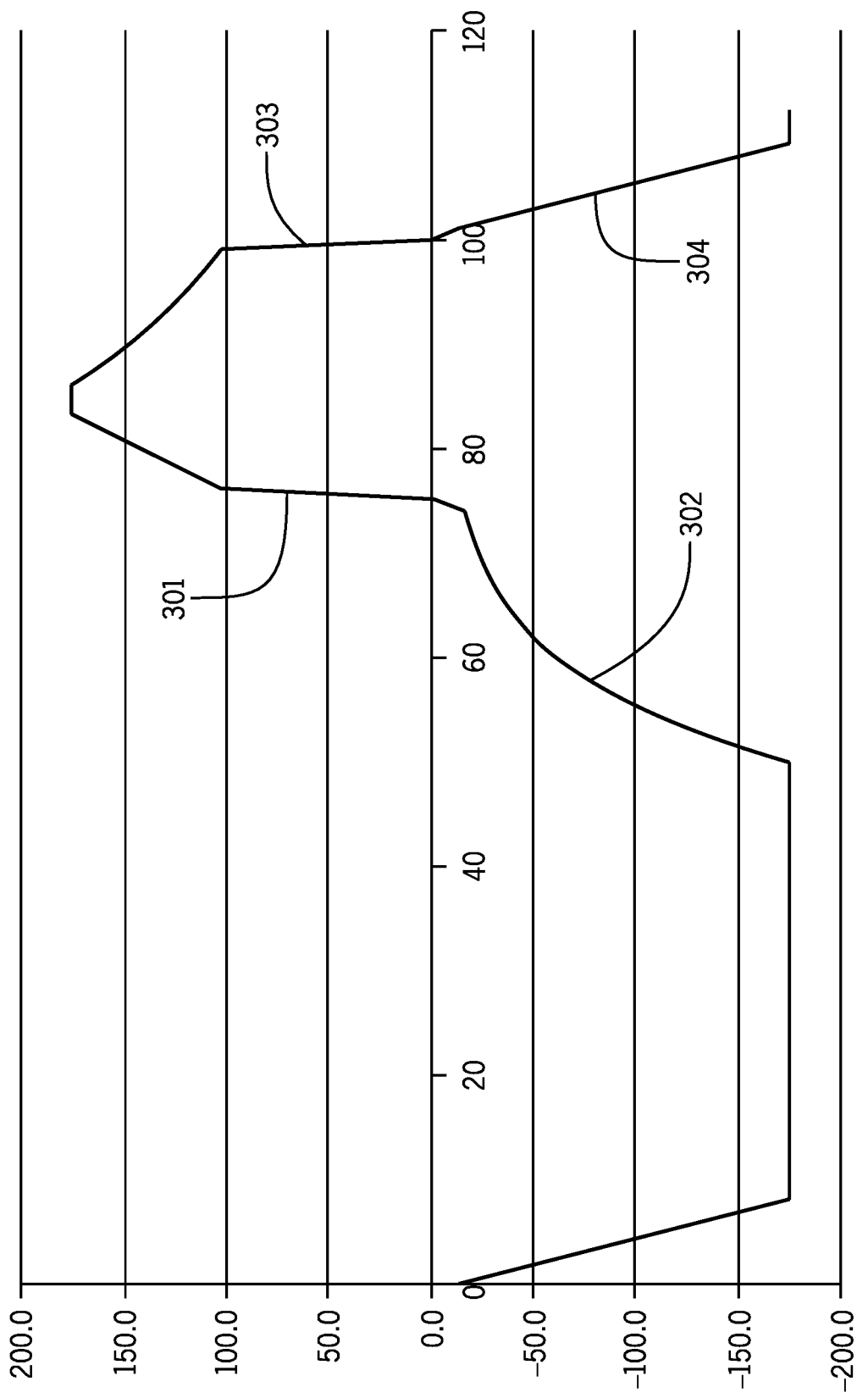
FIG. 3 is an output waveform from a prior art half-bridge inverter.
Figure 4:
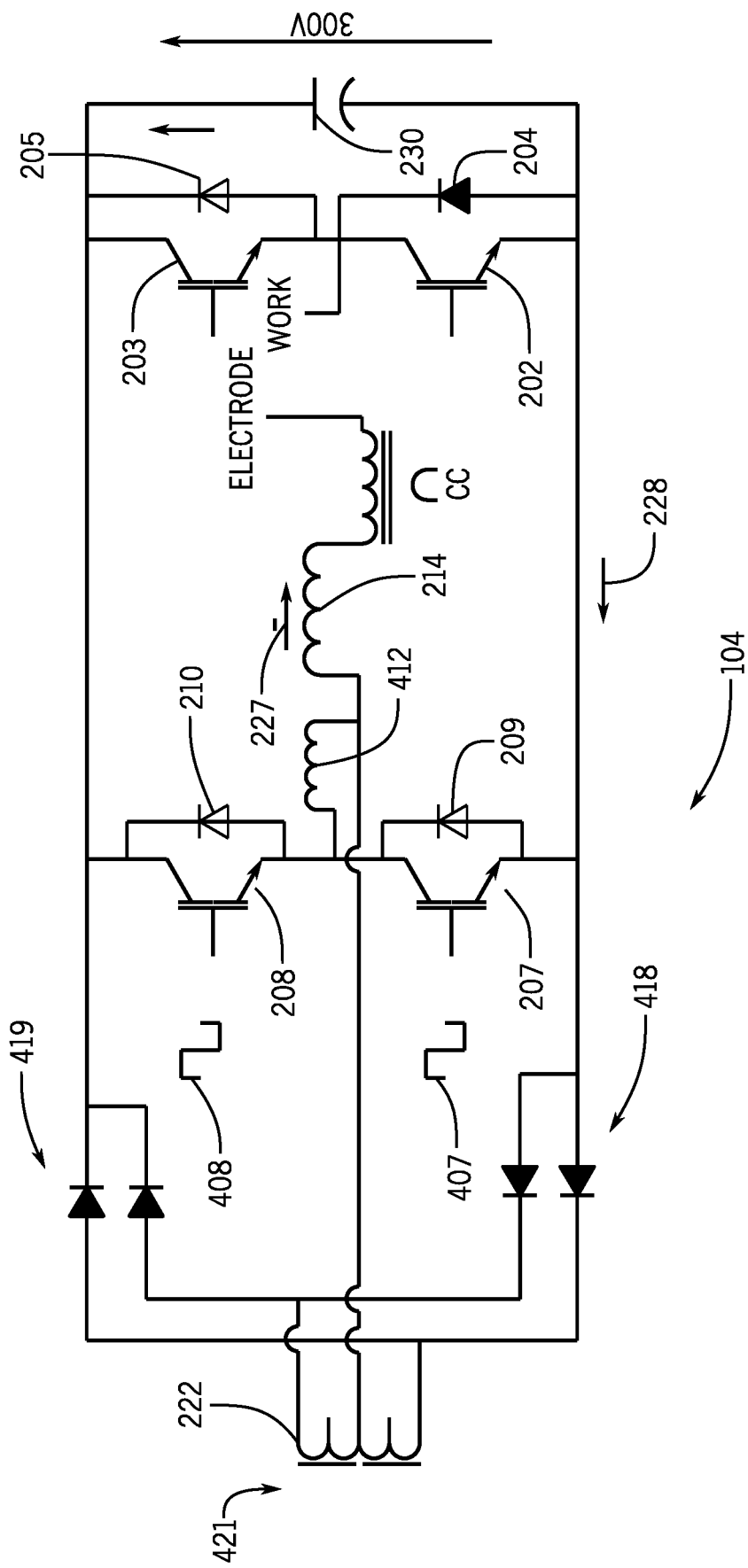
FIG. 4 is a circuit diagram of a half bridge inverter in accordance with this disclosure.

Referring now to FIG. 4, a transformer 421 is similar to transformer 221, but does not include the higher voltage windings 223. Output circuit 104 includes in some embodiments a primary side inverter, a transformer and a rectifier that serve as a current source for a half bridge inverter. The preferred embodiment uses an assist boost circuit described below) to provide the assist voltage. Alternatives embodiment use a transformer such as that of FIG. 2, or a buck circuit or other converter, to provide the assist voltage, or not providing an assist voltage.

Rectifiers 418 and 419 rectify the output of transformer 421. Transformer 421 is fed by a primary side inverter that inverts dc bus 103, and acts as a current source to the half bridge output inverter (switches 202 and 203). Thus, dc bus 103 provides power to the half bridge output inverter.

Switches 207 and 208 can be controlled in such a way as to provide for control of di/dt during commutation which is useful for helping the arc remain lit, and for providing a desired current output. Switches 207 and 208 are, in the preferred embodiment, commutation switches and, along with anti-parallel diodes 209 and 210, inductor 412 and capacitor 230, a commutation circuit. The voltage across capacitor 230 is referred to herein as the inverter dc bus. Commutation circuit, as used herein, is a circuit which is active to assist the current commutating.

Switches 207 and 208 can also be controlled other than during commutation to control di/dt, which is useful for responding to transients or to provide rapid changes in the output waveform. Also, they can be controlled in such a way as to provide a boosted voltage for assisting with commutation and transients.

Control of di/dt during reversals and can be understood by considering each quadrant: 1) control of the current magnitude decreasing when in EP; 2) control of the current magnitude increasing when in EN; 3) control of the current magnitude decreasing when in EN; and 4) control of the current magnitude increasing when in EP. An output current reversal can be described as the current first decreasing in magnitude in the initial polarity, and then after zero crossing increasing in magnitude in the new polarity. Thus, four quadrant control can be used to control di/dt throughout an output current reversal. Also, four quadrant control can be used to control respond to a transient, by increasing or decreasing the output magnitude quickly as needed, until the transient is overcome, and normal (prior art) control of the output can be resumed. Normal control refers to controlling the output magnitude by controlling the input to the half-bridge inverter.

Control of di/dt in EP when the current magnitude is decreasing is used prior to a zero crossing during an EP to EN reversal, and will be described first. Switch 202 is on in EP. The prior art provided for decreasing output current magnitude by leaving switch 202 on, and removing power applied to the half bridge inverter (from the preregulator 102, primary side inverter and transformer). This disclosure teaches a new way to decrease the current.

To decrease current magnitude in EP, switch 202 is turned off, and switch 208 is modulated (turned on and off multiple times), and switches 203 and 207 remain off. When switch 208 is on, a freewheeling path including switch 208, commutation inductor 226, output inductor 214, and diode 205, is formed. This causes the output current to decay less rapidly than when switch 208 is off (and there is no free wheeling path). By modulating switch 208 (represented by on-off pulse 408), di/dt can be controlled to be anywhere between the decay without switch 208 to a decay with switch 208 being continuously on. The modulating occurs for this segment when the current is decreasing in magnitude before the zero crossing. The modulating can be pulse width modulation (PWM), pulse frequency modulation (PFM), hysteretic control, or other modulation. Commutation and output inductors 226 and 214 could be omitted in alternative embodiments.

The more switch 208 is on, the closer di/dt is to the di/dt of switch 208 being continuously on. The less switch 208 is on the closer di/dt will be to vertical. Consideration should be given to stresses on the switches when switch 208 is off, because the inductance in inductor 214 can cause a high voltage. On-off pulses 408 are modulating control signals for switch 208. Modulating control signals, as used herein, refers to control signals that cause a switch to turn on and off multiple times to produce a desired output, such as PWM, PFM, hysteretic control, etc.

Figure 5:
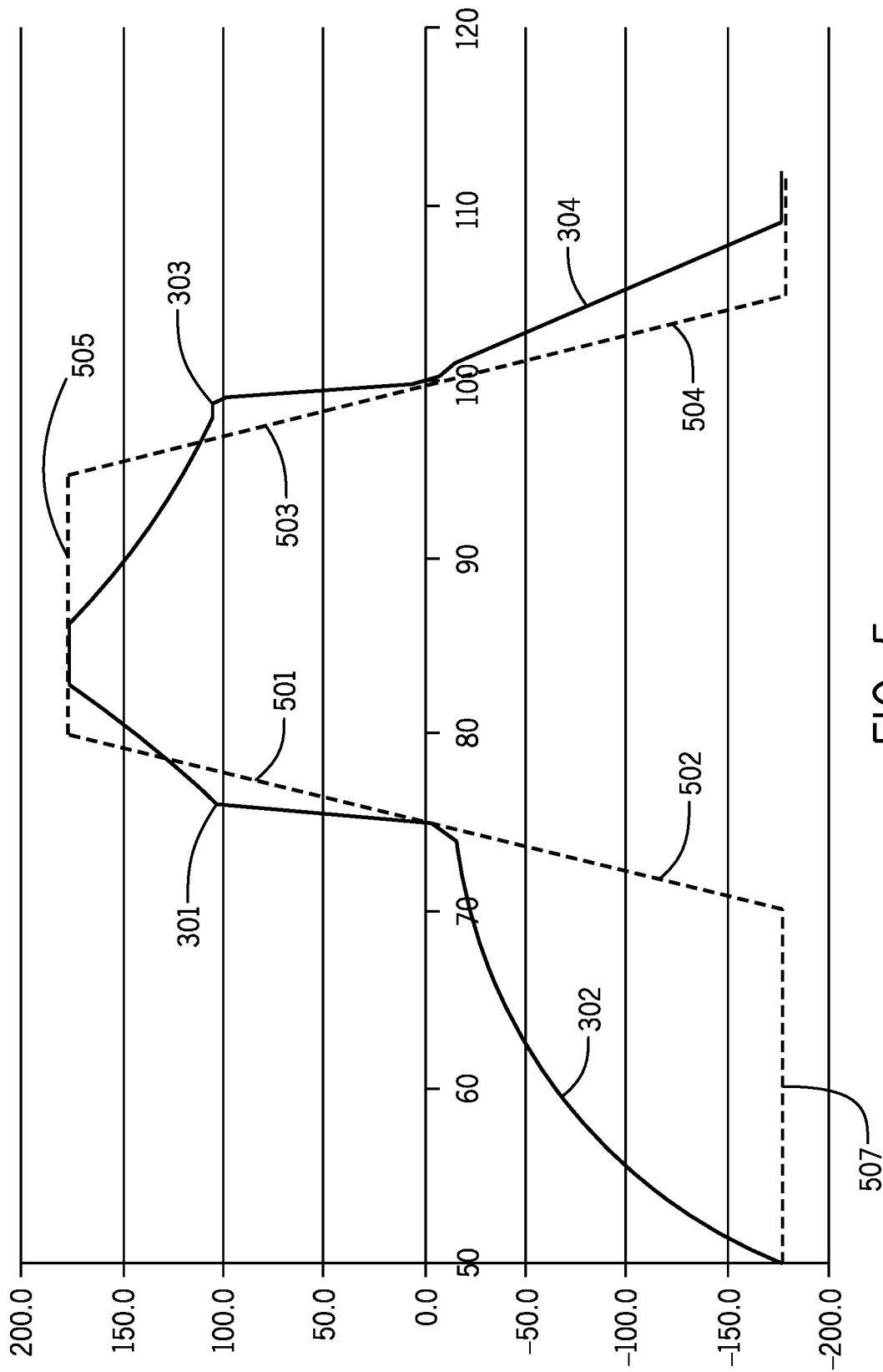
FIG. 5 is an output waveform from a half bridge inverter in accordance with this disclosure and an output waveform from a prior art half-bridge inverter.

FIG. 5 shows a graph of an output controlled consistent with this disclosure, as well as the prior art output. During an EP to EN reversal prior to zero crossing, shown as segment 503, di/dt is controlled to be steeper than that of prior art segment 303. This allows considerably more time at the desired EP high current plateau and thus greater process control. While segment 503 is shown as a straight line, any shape may be obtained by proper modulation of switch 208. Segment 503 is described as having a rate of change, even when that rate changes or varies.

During an EP to EN reversal, and after zero crossing, the current is increasing in magnitude and the polarity is EN, and switch 203 is on. Control of di/dt after the zero crossing during an EP to EN reversal is provided by modulating switch 207 (turning it on and off multiple times) when the current magnitude is increasing after zero crossing and during commutation. When switch 207 is on, the high voltage source (from capacitor 230) is applied to the output, and current increases very rapidly. (The creation of the high assist voltage across capacitor 230 will be described below, but can alternatively be in accordance with the prior art). When switch 207 is off, the current increases at the "normal" slower rate.

By modulating the switch (represented by on-off pulse 407), di/dt can be controlled to be anywhere between the prior rate of increases to almost vertical. The modulating occurs for this segment when the current is increasing in magnitude after the zero crossing. The modulating can be pulse width modulation (PWM), pulse frequency modulation (PFM), hysteretic control, or other modulation. On-off pulses 408 are modulating control signals for switch 208. The more switch 207 is on, the steeper di/dt is.

Referring again to FIG. 5, the graph of the output during an EP to EN reversal after zero crossing, shown as segment 504, has a di/dt controlled to be steeper than that of prior art segment 304. This allows more time at the desired EN high current plateau and thus greater process control. While segment 504 is shown as a straight line, any shape may be obtained by proper modulation of switch 207. Segment 504 is described as having a rate of change, even when that rate is not constant and changes or varies.

The EN to EP reversal is similarly controlled. When in EN switch 203 is normally on, and to decrease the current magnitude in EN while controlling di/dt, switch 203 is turned off, forcing anti-parallel diode 204 to conduct, and switch 207 is modulated (turned on and off), while switches 202, 203 and 208 are off. When switch 207 is on, a freewheeling path including the output, inductors 214, 412, switch 207 and anti-parallel diode 204 is formed. This causes the output current to decay less rapidly than when switch 207 is off (and there is no free wheeling path).

By modulating switch 207 (represented by on-off pulse 407), di/dt can be controlled to be anywhere between the decay without switch 207 to a decay with switch 207 being continuously on. The modulating occurs for this segment when the current is decreasing in magnitude prior to the zero crossing. The modulating can be pulse width modulation (PWM), pulse frequency modulation (PFM), hysteretic control, or other modulation. The more switch 207 is on, the closer di/dt is to the di/dt of switch 207 being continuously on. The less switch 207 is on the closer di/dt will be to vertical. Consideration should be given to stresses on the switches when switch 208 is off, because the inductance in inductor 214 can cause a high voltage.

FIG. 5 shows a controlled di/dt for a decreasing magnitude EN current as segment 502. Di/dt of segment 502 is controlled to be steeper than that of prior art segment 302. This allows considerably more time at the desired EP high current plateau and thus greater process control. While segment 502 is shown as a straight line, any shape may be obtained by proper modulation of switch 207. Segment 502 is described as having a rate of change, even when that rate changes or varies.

During an EN to EP reversal, and after zero crossing, the current is increasing in magnitude and the polarity is EP, and switch 202 is on. Control of di/dt after the zero crossing during an EP to EN reversal is provided by modulating switch 208 (turning it on and off). When switch 208 is on, the high voltage source (from capacitor 230) is applied to the output, and current increases very rapidly. When switch 208 is off, the current increase at the "normal" rate.

By modulating switch (represented by on-off pulse 408), di/dt can be controlled to be anywhere between the prior rate of increases to almost vertical. The modulating occurs for this segment when the current is increasing in magnitude after the zero crossing. The modulating can be pulse width modulation (PWM), pulse frequency modulation (PFM), hysteretic control, or other modulation. The more switch 208 is on, the steeper di/dt is.

Referring again to FIG. 5, the graph of the output during an EP to EN reversal after zero crossing, shown as segment 501, has a di/dt controlled to be steeper than that of prior art segment 301. This allows more time at the desired EN high current plateau and thus greater process control. Segment 501 is described as having a rate of change, even when that rate changes or varies.

FIG. 5 shows a constant di/dt before and after zero crossing. However, by varying the PWM control signal (or other modulating control signal), di/dt can be varied as desired. It can have steps, be continuously varied, or intermittently varied. Each segment may be controlled individually, and there can be varying within each segment as desired. Also, control could be provided for only part of the current reversal. For example, switch 207 could be used prior to the reversal, and then nothing after the reversal. Likewise, switch 208 could be used prior to a reversal, and then nothing after the reversal. Or control can be provided for less than the time from the start of the reversal to zero crossing or less than the time form zero crossing to normal operation.

Control for each quadrant is summed up in the following table (note that the current magnitude is referenced):

| | Switch 202 | Switch 203 | Switch 207 | Switch 208 |
|---|---|---|---|---|
| EP Decreasing current magnitude | OFF | OFF | OFF | Modulated |
| EP Increasing current magnitude | ON | OFF | OFF | Modulated |
| EN Increasing current magnitude | OFF | ON | Modulated | OFF |
| EN Decreasing current magnitude | OFF | OFF | Modulated | OFF |

Transient control can be provided by controlling the rate of change at times other than polarity reversals. Di/dt control is provided in whatever direction needed until the transient is overcome, and then switches 207 and/or 208 can remain off, or be used to provide the assist voltage as described below. After the transient is overcome, normal control of the output is resumed.

The assist high voltage across capacitor 230 can be provided by using one or both of switches 207 and 208 along with inductor 412 as a boost circuit. Preferably this is done other than during commutation and/or transient response, such as during plateau segments 506 and 507 of FIG. 5, so that switches 207 and 20 can be used to control di/dt during commutation. When switch 207 (which is a boost switch in this operation) is on, a current path from the center tap of transformer winding 222 through inductor 412 (which is a boost inductor in this operation), through switch 207 and through diodes 418 is formed, charging inductor 412. When switch 207 is turned off, the current in inductor 412 is provided through anti-parallel diode 210 to charge capacitor 230. Switch 207 is modulated as a normal boost switch to control the voltage on capacitor 230.

Similarly, when switch 208 is on a current path from the top of transformer winding 222, through diodes 419, through switch 208 and through inductor 412 is formed, charging inductor 412. When switch 208 is turned off, the current in inductor 412 is provided through anti-parallel diode 209 to charge capacitor 230 (driving the voltage on the bottom of capacitor 230 lower). Switch 208 is modulated as a normal boost switch to control the voltage on capacitor 230.

The boost operation can be performed whenever di/dt is not being controlled, such as other than during commutation and other than during transient control, to combine the various aspects of this design.

Figure 6:
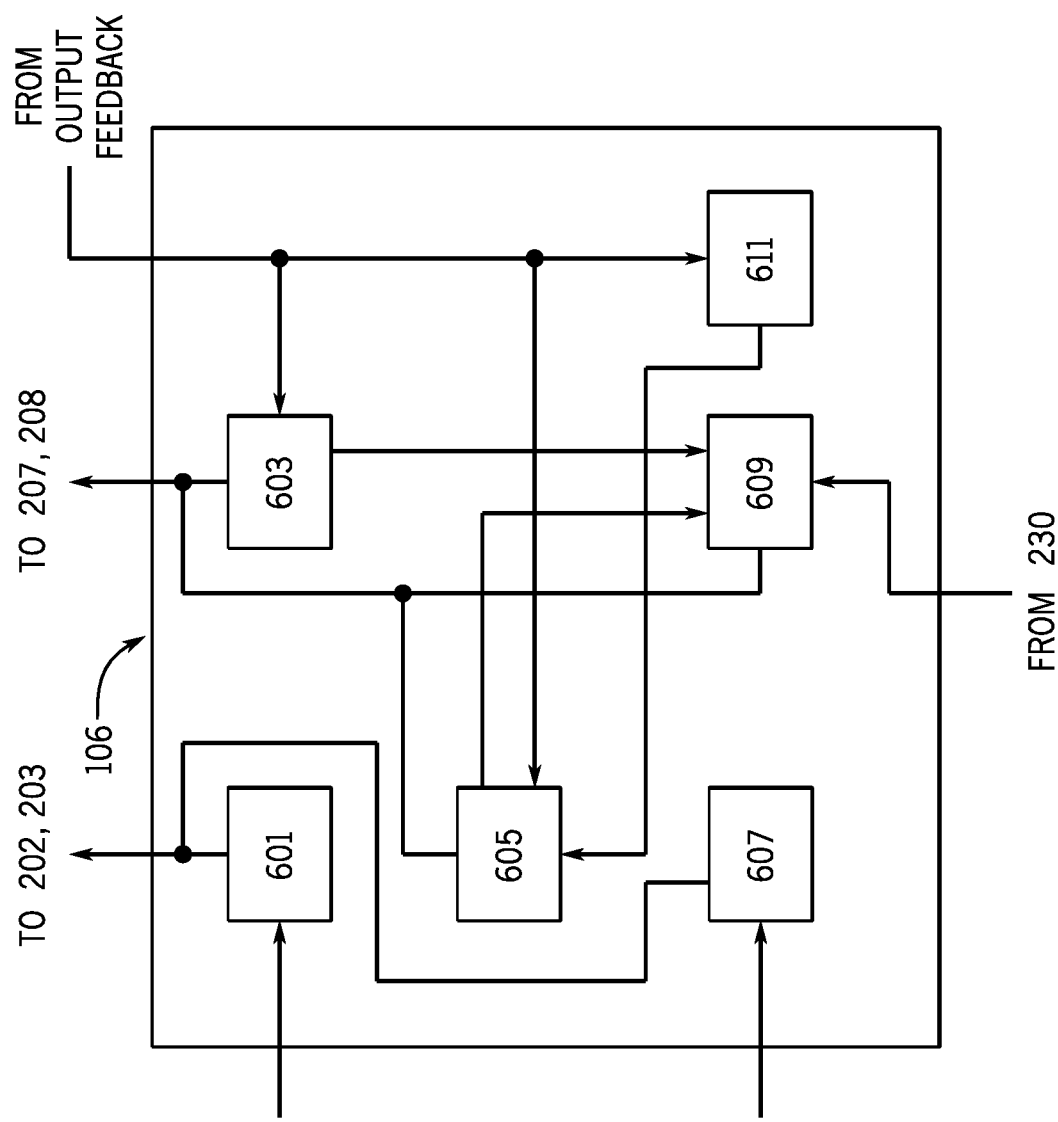
FIG. 6 is a control module.

Controller 106 (also control module 106) is shown in FIG. 6, and includes an inverter control module 601, a commutation control module 603, a ramp module 605, a dc control module 607, a boost control module 609 and a transient detection module 611. Each of these modules are preferably software modules that provide control signals to the relevant switches to turn them on and off in such a way as to provide the desired control. Controller 106 may be software and/or hardware, and may be in one location os in multiple locations.

Inverter control module 601 provides control signals to switches 202 and 203 to steer the output negative or positive as desired. the polarity can be reversed based on a program, time, or feedback. Inverter control module, as used herein, is a control module that controls a half bridge inverter to produce a desired output.

Commutation control module 603 controls switches 208 and 207 during commutation by providing modulating control signals (or timing signals) that cause the output current to have the desired di/dt, as described above. Commutation control module 603 could also provide the steering control signals to switches 202 and 203 (instead of having the steering control signals come from inverter control module 601). Commutation control module 603 preferably receives feedback indicative of the output current, so that the control can be closed loop. Commutation control module, as used herein, is a control module that controls a commutation circuit.

Ramp module 605 controls switches 208 and 207 other than during commutation to provide the desired di/dt, as described above Ramp module 605 and commutation module 603 could be implemented as a single module to control switches 207 and 208 at different times in the weld cycle. Ramp module 605 preferably receives feedback indicative of the output current, so that the control can be closed loop. When ramp module 605 is active, switches 207 and 208 are output control switches and part of an output control circuit. Ramp module is a control module that controls a circuit to provide a desired rate of change in an output. Output control circuit refers to a circuit with switches used to control the rate of change of the output.

Ramp module 605 can be operated in one, two, three or four quadrants. When module 605 and/or module 603 are operated in four quadrants, modules 605 and/or 603 are a four quadrant control module. Four quadrant control module refers to ramp and inverter modules operated in all four quadrants.

DC control module 607 is used to control switches 202 and 203 to provide a dc output (of one polarity or the other). DC control module 607 and inverter control module 601 could be implemented as a single module to control switches 202 and 203 differently based on the desired process (ac or dc). DC control module, as used herein, refers to a control module that controls power switches to provide a dc output. The boost and/or ramp modules can be used when in dc to respond to transients or waveshape.

Boost control module 609 is used to control switches 207 and 208 to provide a boosted bus across capacitor 230. Boost control module 609 and ramp module 605 and/or commutation module 603 could be implemented as a single module to control switches 207 and 208 at different times in the weld cycle. Boost control module 609 receives feedback indicative of the voltage on capacitor 230. Boost control module, as used herein, refers to a control module that controls power switches to provide a boosted dc output.

Transient detection module 611 is used to detect transients on the output. Transient detection module preferably receives feedback indicative of the output and provides an activation control signal to ramp module voltage 605. Transient detection module, as used herein, refers to a control module that detects a transient.

If the assist voltage on capacitor 230 is not sufficient to provide the desired di/dt, then boost control module 609 could command the boost voltage on capacitor to be a greater magnitude as desired. Likewise, if the assist voltage on capacitor 230 is more than needed to provide the desired di/dt, then boost control module 609 could command the boost voltage on capacitor to be a lesser magnitude as desired. Signals from ramp module 605 and commutation control module 603 can provide the information to boost control module 609 regarding the desired voltage.

Numerous modifications may be made to the present disclosure which still fall within the intended scope hereof. Thus, it should be apparent that there has been provided a method and apparatus for providing welding type power that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. An output circuit for a welding-type power supply disposed to receive an input from a direct current (DC) bus and provide an arc welding-type output, the output circuit comprising:
    a half-bridge inverter having at least a first switch and a second switch, wherein the half bridge inverter is connected to receive power from the DC bus and provide power to the arc welding-type output;
    an output inductor;
    a boost circuit that includes a boost inductor, an inverter DC bus, and a third switch, wherein:
        the boost circuit boosts a voltage of the inverter DC bus to a desired magnitude when the third switch operates in a boosting mode of a first boosting event of the voltage of the inverter DC bus; and
        the third switch controls a rate of change of a current of the arc-welding type output when the third switch is operating in a commutating mode of a first commutation event of the current of the arc-welding type output.

2. The output circuit of claim 1, wherein the the boost circuit further includes a fourth switch, wherein the boost circuit boosts the voltage on the inverter DC bus to the desired magnitude when the fourth switch operates in a boosting mode of a second boosting event of the voltage.

3. The output circuit of claim 1, wherein the output circuit provides the arc welding-type output across an electrode output and a work output, and wherein the output inductor is disposed such that current in the output inductor also flows through the work output and the electrode output and at least one of the first switch and the second switch.

4. The output circuit of claim 1, wherein the third switch modifies a rate of change of a current of the arc-welding type output by commutating during a single commutation of the current to the first switch.

5. A welding-type power supply comprising:
    a direct current (DC) bus; and
    an output circuit disposed to receive an input from the DC bus and configured to provide an arc-welding type output, the output circuit comprising:
        a half-bridge inverter having at least a first switch and a second switch, wherein the half bridge inverter is connected to receive power from the DC bus and provide power to the arc welding-type output;
        an output inductor; and
        a boost circuit that includes a boost inductor, an inverter DC bus, and a third switch, wherein:
            the boost circuit boosts a voltage of the inverter DC bus to a desired magnitude when the third switch operates in a boosting mode of a first boosting event of the voltage of the inverter DC bus; and
            the third switch controls a rate of change of a current of the arc-welding type output when the third switch operates in a commutating mode of a first commutation event of the current of the arc-welding type output.

6. The welding-type power supply of claim 5, further comprising a control module configured to provide commands to the output circuit, wherein the control module comprises:
    an inverter control module that provides control signals to the half bridge inverter;
    a commutation control module configured to provide first modulating control signals to the third switch to control the third switch according to the commutating mode of the first commutation event of the current to control the rate of change of the current; and
    a boost control module configured to provide second modulating control signals to the third switch to control the third switch according to the boosting mode of the first boosting event to boost the voltage of the inverter DC bus.

7. The welding-type power supply of claim 6, further comprising an input rectifier disposed to receive power from a power source and configured to provide the input to the DC bus as a rectified signal.

8. The welding-type power supply of claim 6, wherein:
    the rate of change of the current is a first rate of change;
    the boost circuit further includes a fourth switch;
    the commutation control module is further configured to provide third modulating control signals to the fourth switch to control the fourth switch according to a commutating mode of a second commutation event of the current to control a second rate of change of the current; and
    the boost control module is further configured to provide fourth modulating control signals to the fourth switch to control the fourth switch according to a boosting mode of a second boosting event to boost the voltage of the inverter DC bus.

9. The welding-type power supply of claim 5, wherein the output circuit provides the arc welding-type output across an electrode output and a work output, and wherein the output inductor is disposed such that current in the output inductor also flows through the work output and the electrode output and at least one of the first switch and the second switch.

10. The welding-type power supply of claim 5, further comprising a control module configured to provide commands to the output circuit, the control module comprising a commutation control module configured to provide first modulating control signals to the third switch to control the third switch according to the commutating mode of the first commutation event of the current to control the rate of change of the current.

11. The welding-type power supply of claim 10, wherein the first modulating control signal comprises at least one of a pulse width modulating control signal, a pulse frequency modulating control signal, or a hysteretic modulating control signal.

12. The welding-type power supply of claim 10, further comprising a feedback circuit configured to provide a feedback signal indicative of a magnitude of the arc-welding type output to the control module, wherein the control module further comprises a ramp control module configured to provide ramping modulating control signals to the third switch to control a ramping rate of change of the current of the arc-welding type output based on the feedback signal by controlling the third switch according to a ramping mode during a ramping period of the ramping rate of change.

13. The welding-type power supply of claim 10, wherein:
    the rate of change of the current is a first rate of change;
    the boost circuit further includes a fourth switch; and
    the commutation control module is further configured to provide third modulating control signals to the fourth switch to control the fourth switch according to a commutating mode of a second commutation event of the current to control a second rate of change of the current.

14. The welding-type power supply of claim 5, wherein the control module further comprises a boost control module configured to provide second modulating control signals to the third switch to control the third switch according to the boosting mode of the first boosting event to boost the voltage of the inverter DC bus.

15. A welding-type power supply comprising:
   a direct current (DC) bus;
   an output circuit disposed to receive an input from the DC bus and configured to provide an arc-welding type output, the output circuit comprising:
      a half-bridge inverter having at least a first switch and a second switch, wherein the half bridge inverter is connected to receive power from the DC bus and provide power to the arc welding-type output;
      an output inductor; and
      a boost circuit comprising a boost inductor, an inverter DC bus, and a third switch; and
   a control module configured to provide commands to the output circuit, the control module comprising:
      a commutation control module configured to provide first modulating control signals to the third switch to control the third switch according to a commutating mode of a first commutation event of a current of the arc welding-type output to control a rate of change of the current; and
      a boost control module configured to provide second modulating control signals to the third switch to control the third switch according to a boosting mode of a first boosting event to boost a voltage of the inverter DC bus.

16. The welding-type power supply of claim 15, wherein:
the rate of change of the current is a first rate of change;
the boost circuit further comprises a fourth switch;

the commutation control module is further configured to provide third modulating control signals to the fourth switch to control the fourth switch according to a commutating mode of a second commutation event of the current to control a second rate of change of the current; and the boost control module is further configured to provide fourth modulating control signals to the fourth switch to control the fourth switch according to a boosting mode of a second boosting event to boost the voltage of the inverter DC bus.

17. The welding-type power supply of claim 15, further comprising a feedback circuit configured to provide a feedback signal indicative of a magnitude of the arc-welding type output to the control module, wherein the control module further comprises a ramp control module configured to provide ramping modulating control signals to the third switch to control a ramping rate of change of the current of the arc-welding type output based on the feedback signal by controlling the third switch according to a ramping mode during a ramping period of the ramping rate of change.

18. The welding-type power supply of claim 15, wherein the control module further comprises an inverter control module configured to provide control signals to the half bridge inverter.

19. The welding-type power supply of claim 15, further comprising an input rectifier disposed to receive power from a power source and configured to provide the input to the DC bus as a rectified signal.

20. The welding-type power supply of claim 15, wherein the output circuit provides the arc welding-type output across an electrode output and a work output, and wherein the output inductor is disposed such that current in the output inductor also flows through the work output and the electrode output and at least one of the first switch and the second switch.

* * * * *